United States Patent [19]
Coles

[11] Patent Number: 6,062,500
[45] Date of Patent: May 16, 2000

[54] HIGH SPEED REEL

[75] Inventor: Paul Coles, Sharon, Mass.

[73] Assignee: Quantum Corporation, Milpitas, Calif.

[21] Appl. No.: 09/088,796

[22] Filed: Jun. 1, 1998

[51] Int. Cl.⁷ .......................... G11B 23/087; G11B 23/04; G11B 23/107; B65H 75/12
[52] U.S. Cl. ....................... 242/332.8; 242/345; 242/337; 242/348; 242/608.4; 242/614; 360/132; 360/137
[58] Field of Search ................................. 242/332.8, 345, 242/614, 614.1, 608.4, 609.2, 118.6, 337, 348; 360/132, 137

[56] References Cited

U.S. PATENT DOCUMENTS

| | | | |
|---|---|---|---|
| 3,099,414 | 7/1963 | Kulka | 242/614 |
| 3,106,361 | 10/1963 | Boyer | 242/345 |
| 3,342,435 | 9/1967 | Gelardi et al. | 242/614 |
| 3,768,750 | 10/1973 | Menary | 242/614 |

*Primary Examiner*—John Q. Nguyen
*Attorney, Agent, or Firm*—Steven G. Roeder

[57] ABSTRACT

A reel for a tape drive and cartridge is provided herein. The reel can be utilized as a take-up reel for the tape drive and/or a feed reel for the cartridge. The reel includes a hub which receives the storage tape and a pair of guide bars which guide the storage tape onto the hub. Importantly, the guide bars inhibit lateral tape movement during transfer of the storage tape between the take-up reel and the feed reel. This minimizes data recovery errors and increases the life of the storage tape.

17 Claims, 4 Drawing Sheets

HIGH SPEED REEL

FIELD OF THE INVENTION

The present invention relates generally to tape drives which utilize a cartridge for storing data. More specifically, the present invention relates to a high speed tape drive having an improved take-up reel which minimizes lateral movement of the storage tape and maximizes the life of the storage tape.

BACKGROUND

Tape drives are widely used for storing information in digital form. These tape drives commonly use a storage tape having a thin film of magnetic material for receiving the information. Typically, the storage tape is moved between a feed reel and a take-up reel, past a data transducer to record or read back information from the storage tape. In one type of tape drive system, the take-up reel is part of the tape drive, while the feed reel is part of a removable cartridge. Alternately, in another type of tape drive system, the feed reel and the take-up reel are both part of the removable cartridge.

The need for increased storage capacity has led to the need to increase data density of the storage tape. Further, the need for decreasing retrieval time has led to increasing the speed of movement of the storage tape between the reels. With increased data densities and tape speeds, the accurate and stable movement of the storage tape past the data transducer is critical to the accurate transfer and retrieval of information from the storage tape.

Unfortunately, transfer of the storage tape between the reels often results in lateral movement of the storage tape. This lateral movement increases data transfer errors and decreases the life of the storage tape. Presently, in most tape drive systems, each reel includes a hub which separates a pair of disk-shaped flanges. The flanges guide the storage tape on to and off of the hub. One attempt to reduce the lateral tape movement includes adding bumps to the flanges to better guide the storage tape. However, the bumps in the flanges are relatively difficult and expensive to accurately manufacture. Further, with this type of reel, only a small distance exists between the bumps in the flanges of the take-up reel. Accordingly, it is necessary to provide a relief, commonly referred to as an involute, in one of the flanges of the take-up reel to allow for a take-up leader to pass onto the take-up reel because the take-up leader is wider than the storage tape. The involute is also very difficult and expensive to manufacture into the flanges. Accordingly, there is a need for an easier, more accurate, and less expensive way to inhibit lateral tape movement and increase storage tape life.

In light of the above, it is an object of the present invention to provide a tape drive system which inhibits lateral tape movement and minimizes wear of the storage tape. Still another object of the present invention is to provide a tape drive system having increased storage capacity, decreased data retrieval time, and more accurate data retrieval. Yet another object of the present invention is to provide a tape drive system which is relatively easy and cost efficient to manufacture and utilize.

SUMMARY

The present invention is directed to a reel for a tape drive or a cartridge which satisfies these objectives. The reel includes a hub which is sized and shaped to receive a storage tape and a pair of guide bars which are secured to the hub. The guide bars are uniquely spaced apart to better guide the storage tape onto the hub between the guide bars. Importantly, the guide bars decrease the lateral tape movement of the storage tape and extend the life of the storage tape. This decreases data transfer errors. Further, because of the decreased lateral tape movement, the density of the stored data can be increased and storage tape can be moved at a higher speeds.

Preferably, each of the guide bars includes a rounded cross-section so that the storage tape contacts a rounded surface. For example, for ease of manufacturing each guide bar can include a circular cross-section. Additionally, each guide bar includes a pair of opposed bar distal ends and an intermediate section therebetween. As provided herein, the guide bars are spaced apart so that a distal bar gap between one of the bar distal ends of each guide bar is greater than a hub width of the hub and a tape width of the tape. Further, the guide bars are deflected so that an intermediate bar gap between the intermediate section of each guide bar is less than the distal bar gap. This feature allows the guide bars to accurately guide the storage tape onto the hub while minimizing wear on the storage tape.

As provided herein, a bar spacer can be utilized to properly space apart the intermediate section of the guide bars. The bar spacer is encircled by and substantially coaxial with the hub. The bar spacer has a spacer width which is less than the hub width so that the guide bars deflect upon attachment to the hub.

The present invention is also a method for manufacturing a reel adapted for receiving a storage tape. The method includes providing a hub, providing a pair of guide bars, and attaching the guide bars to the hub so that a distal bar gap between the distal end of each of the guide bars is larger than the hub width. Preferably, the guide bars are deflected so that the distal bar gap is larger than the hub width so that the guide bars accurately guide the storage tape onto the hub. This can be accomplished by spacing the guide bars apart with a bar spacer having a spacer width which is less than the hub width so that the guide bars are deflected upon attachment to the hub.

Importantly, the tape drive provided herein utilizes an improved reel which reduces lateral tape movement and extends the life of the storage tape. Because of this unique design, the tape drive can utilize a storage tape with increased density and the storage tape can be moved at higher speeds. Further, with less lateral tape movement, the tape drive system is more accurate.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
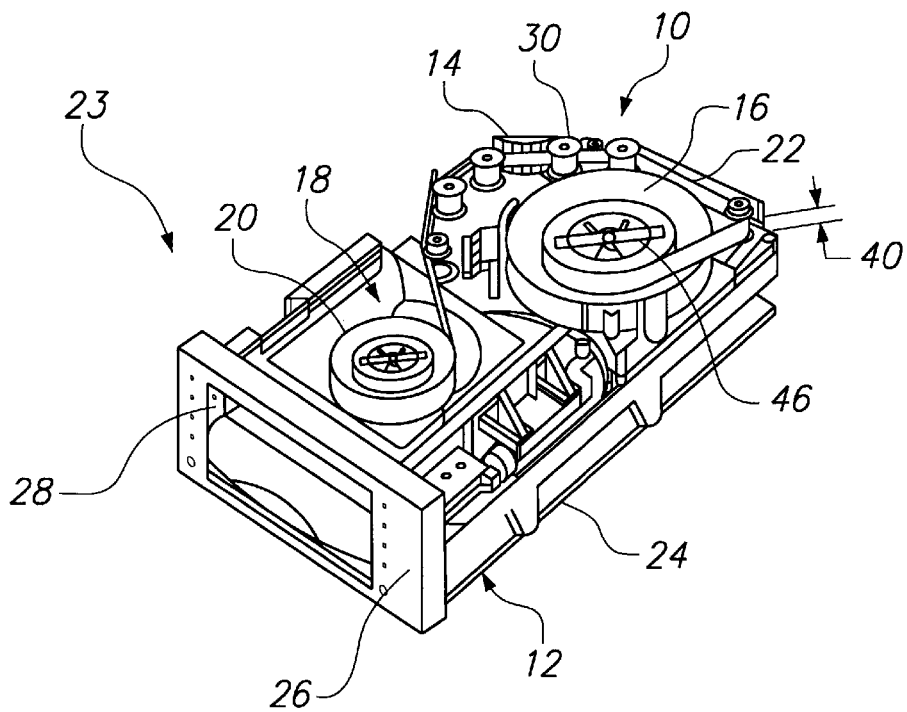
FIG. 1 is a perspective, partly cut-away view of a tape drive and a cartridge having features of the present invention.

Referring initially to FIG. 1, a tape drive 10 having features of the present invention includes a drive housing 12, a data transducer 14, and a take-up reel 16. In the embodiments illustrated herein, the tape drive 10 is used in conjunction with a cartridge 18 having a feed reel 20 which contains a storage tape 22. The tape drive 10 and the cartridge 18 define a tape drive system 23. The reels 16 and 18 provided herein inhibit lateral tape movement of the storage tape 22 during transfer of the storage tape 22 between the take-up reel 16 and the feed reel 20. This minimizes wear on the storage tape 22, enhances the performance of the tape drive 10 and allows for increased tape densities of the storage tape 22.

A detailed description of the various components of a tape drive 10 is provided in U.S. Pat. No. 5,371,638, issued to Saliba, and assigned to Quantum Corporation, the Assignee of the present invention. The contents of U.S. Pat. No. 5,371,638 are incorporated herein by reference. Accordingly, only the structural aspects of a tape drive 10 which are particularly significant to the present invention are provided herein.

The drive housing 12 retains the various components of the tape drive 10. The drive housing 12, shown in FIG. 1, includes a base 24 and a front 26 having a cartridge opening 28 for receiving the cartridge 18. A plurality of tape rollers 30 are rotatably secured to the drive housing 12. The tape rollers 30 guide the storage tape 22 past the data transducer 14 and onto the take-up reel 16. A pair of side walls, a back, and a top of the tape drive 10 are not shown in FIG. 1 for clarity. A representative tape drive 10, without the take-up reel 16 provided herein is sold by Quantum Corporation under the registered trademark DLT®.

Figure 2:
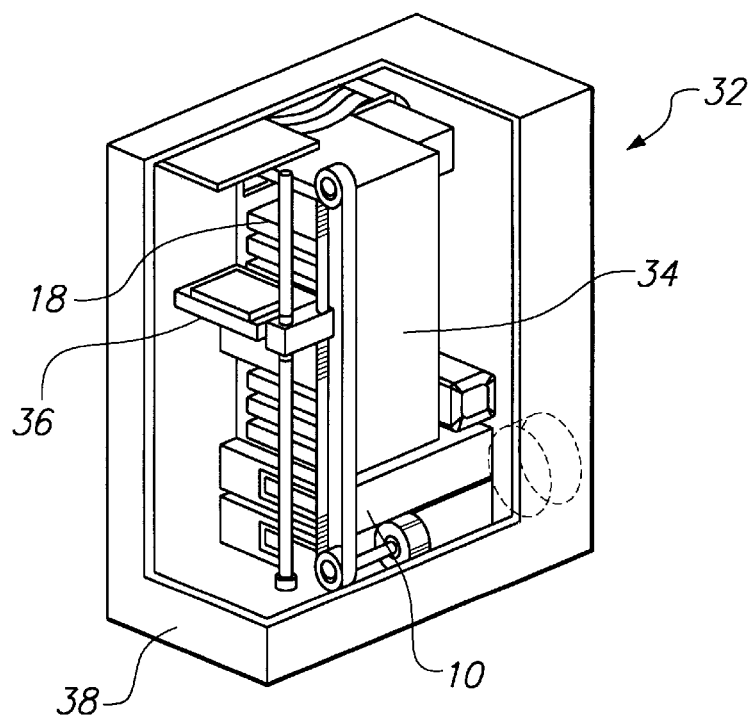
FIG. 2 is a perspective, partly cut-away view of a tape library including the tape drive of FIG. 1.
Figure 3:
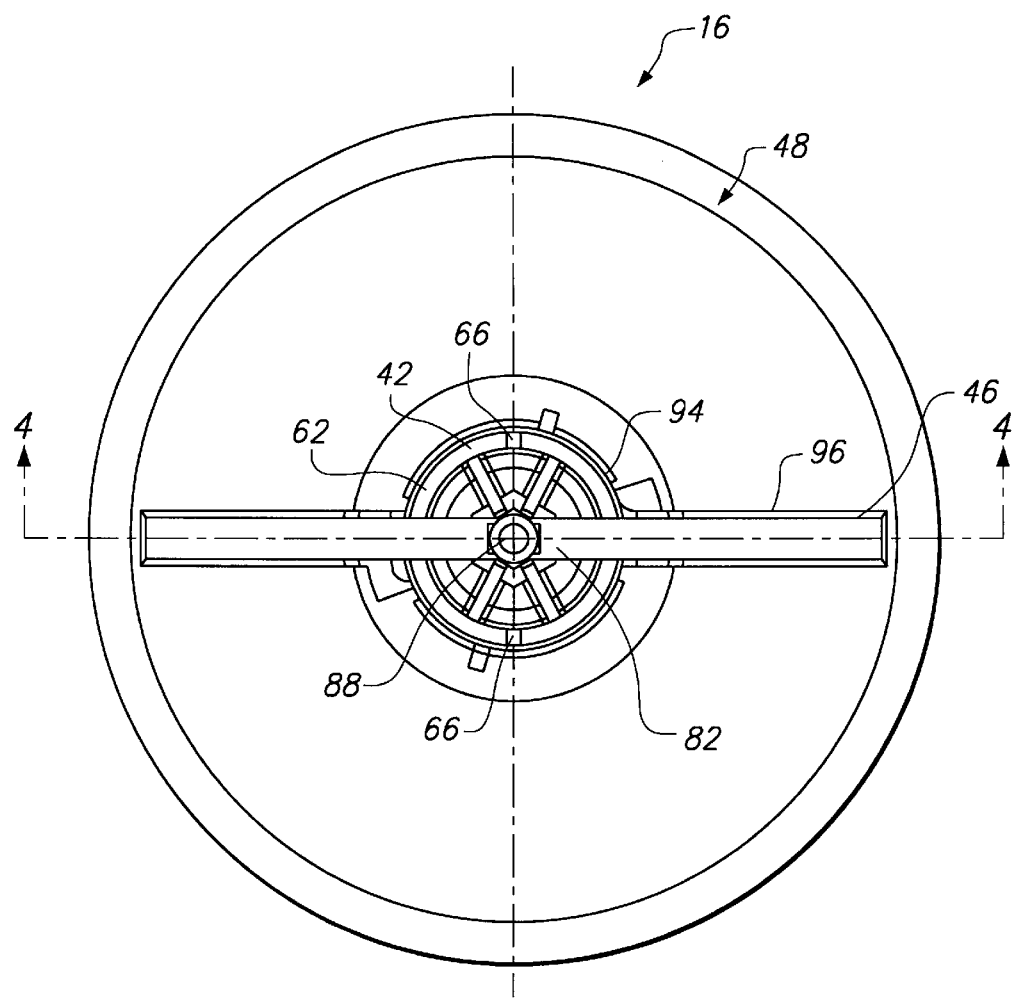
FIG. 3 is a top plan view of a reel having features of the present invention.

The tape drive 10 is typically installed within a computer (not shown), or a word processor (not shown). Alternately, as illustrated in FIG. 2, the tape drive 10 can be utilized as part of a tape library 32. In the embodiment shown in FIG. 2, the tape library 32 includes a plurality of cartridges 18 which are retained in a cartridge magazine 34, a robotic cartridge handler 36, and a plurality of tape drives 10 which are stored in a library housing 38. The robotic cartridge handler 36 is used to selectively retrieve one of the cartridges 18 from the cartridge magazine 34 and place the cartridge 18 within one of the tape drives 10. A representative tape library 32 is sold under the registered trademark DLTstor®, by Quantum Corporation.

The storage tape 22 stores data in a form that can be subsequently retrieved if necessary. Typically, the storage tape 22 is magnetic and stores data in digital form. For the embodiments provided herein, the storage tape 22 has a tape width 40 (illustrated in FIG. 1) of preferably at least approximately one-half an inch (0.5 in.) to conserve space. Alternately, for example, the storage tape 22 can have a tape width 40 of between approximately four millimeters to eight millimeters (4.0 mm–8.0 mm).

The storage tape 22 includes a storage surface which is divided into a plurality of tracks (not shown). Each track can be a linear pattern which extends the length of the storage tape 22. Alternately, for example, the data can be recorded in diagonal strips across the storage tape 22. As a result of the improvements provided herein, the lateral tape movement is decreased and density of the tracks on the storage tape 22 can be increased. This allows more information to be stored on the storage tape 22. For the embodiments provided herein, the storage tape 22 can have between approximately one hundred and twenty-eight (128) tracks to two hundred and eight (208) tracks per inch. However, those skilled in the art, with the teaching provided herein, will recognize that the track density can be more or less than the range provided herein.

The data transducer 14 transfers or transmits information between the computer (not shown) or word processor (not shown) and the storage tape 22. For a magnetic storage tape 22, to read information, the data transducer 14 produces electronic read signals in response to the passage of the tracks on the storage tape 22. To write or transfer data to the storage tape 22, the data transducer 14 generates a magnetic field which is capable of polarizing the desired region of the storage tape 22.

Rotation of the take-up reel 16 and the feed reel 20 results in movement of the storage tape 22 past the data transducer 14. In the embodiment shown in FIG. 1, the feed reel 20 is part of the cartridge 18 and rotates relative to the cartridge 18 while the take-up reel 16 is secured to the tape drive 10. In this embodiment, the take-up reel 16 is attached to a reel shaft (not shown) which rotates relative to the base 24. Alternately, both the feed reel 20 and the take-up reel 16 can be part of the cartridge 18.

Typically, the storage tape 22 is moved at a predetermined velocity past the data transducer 14. Because of the more stable design provided herein, the take-up reel 16 and the feed reel 20 can be rotated so that the storage tape 22 speed past the data transducer 14 is between approximately ten inches per second (10 in./sec.) and two hundred and fifty inches per second (250 in./sec.) and more preferably between approximately fifty inches per second (50 in./sec.) and two hundred inches per second (200 in./sec.). This improves the data transfer rate of the tape drive 10. It is anticipated that the present invention will be useful for tape drives 10 which operate at higher or lower speeds than those provided herein.

The present discussion primarily focuses on the take-up reel 16. However, it should be noted that the design of the take-up reel 16 provided herein can be incorporated into the feed reel 20. Referring now to FIGS. 3–7, the take-up reel 16 includes a hub 42, a bar spacer 44, a pair of guide bars 46, and a pair of flanges 48.

Figure 6:
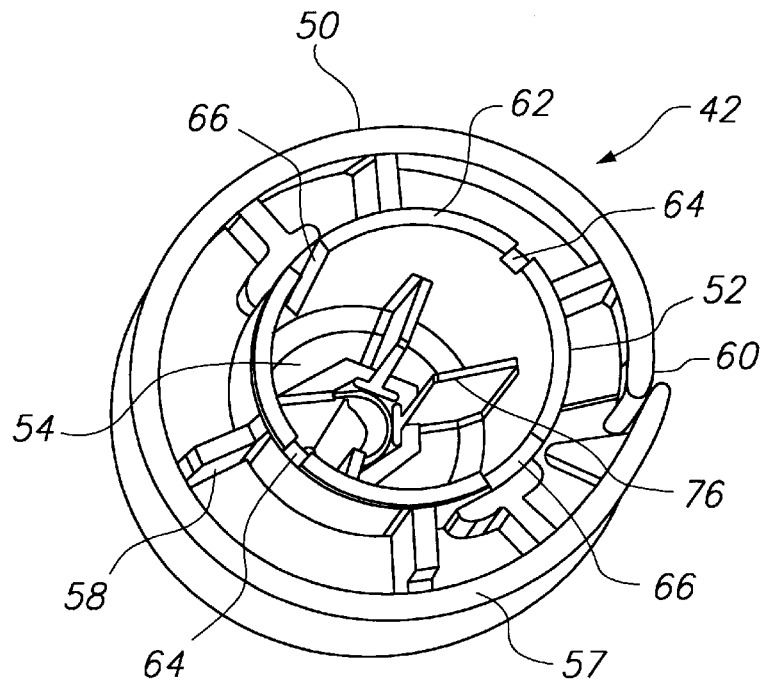
FIG. 6 is a top perspective view of a hub having features of the present invention.
Figure 7:
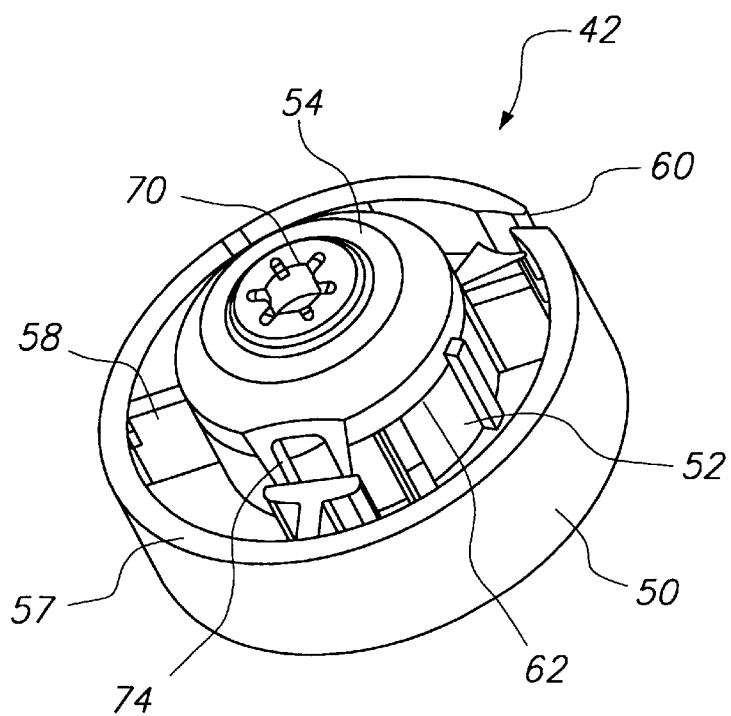
FIG. 7 is a bottom perspective view of the hub of FIG. 6.

As can best be seen with reference to FIGS. 6 and 7, the hub 42 illustrated in the Figures includes an annular outer ring 50, an annular inner ring 52, and an attachment cap 54. The outer ring 50 is sized and shaped to receive the storage tape 22. Accordingly, the size of the outer ring 50 is varied according to the tape width 40. For example, for a half-inch wide storage tape 22, the outer ring 50 has a hub width 56 (shown in FIG. 4) between a pair of opposed hub sides 57 of between approximately 0.501 inches and 0.503 inches. The outer ring 50 is secured to the inner ring 52 with a plurality of hub supports 58 which extend between the outer ring 50 and the inner ring 52. The outer ring 50 includes a ring slot 60 for receiving a tape leader (not shown). The tape leader extends through the ring slot 60 and attaches to the hub 42 to secure the storage tape 22 to the take-up reel 16.

The inner ring 52 is substantially coaxial with the outer ring 50 and includes a pair of opposed hub edges 62. One of the hub edges 62 includes a pair of guide slots 64 for receiving one of the guide bars 46 and a pair of opposed wrench slots 66 for receiving a wrench (not shown) for attaching the hub 42 to the tape drive 10. The attachment cap 54 is secured to the other hub edge 62. The attachment cap 54 includes a socket aperture 70 for receiving hub attachment bolt 72 (shown in FIGS. 4 and 5) and a pair of opposed guide apertures 74 (only one shown in FIG. 4) for receiving one of the guide bars 46. A plurality of spacer supports 76 extend radially inward from the inner ring 52 to center the bar spacer 44 during assembly.

The bar spacer 44 is sized and shaped to fit within the inner hub 42 and is substantially encircled by the inner hub 42. The guide bars 46 are attached to and spaced apart by the bar spacer 44. Preferably, the bar spacer 44 has a spacer width 78 which is less than the hub width 56. For the example provided herein, the spacer width 78 is between approximately 0.495 inches and 0.500 inches. If the spacer width 78 is less than the hub width 56, attachment of the guide bars 46 to the bar spacer 44 causes the guide bars 46 to deflect outwardly. This allows the guide bars 46 to guide the storage tape 22 onto the hub 42.

In the embodiments provided herein, the guide bars 46 are relatively long and have a substantially circular, curved cross-section. Alternately, for example, each guide bar 46 could have an oval shaped cross-section. The rounded cross-section of each guide bar 46 protects the storage tape 22 from contacting a sharp surface. Each guide bar 46 includes a pair of opposed bar distal ends 80 which are separated by an intermediate section 82.

The bar distal ends 80 of each guide bar 46 includes a flange slot 84 for receiving the flanges 48. This feature allows each of the flanges 48 to be made as a unitary structure. Further, the intermediate section 82 of each guide bar 46 includes an attachment aperture 86 which receives a bar attachment bolt 88 for attaching the guide bars 46 together.

Preferably, a distal bar gap 90 between one of the bar distal ends 80 of each guide bar 46 is greater than the hub width 56 of the hub 42, the tape width 40 of the storage tape 22, and the spacer width 78 of the bar spacer 44. Further, an intermediate bar distance 92 between the intermediate section 82 of each guide bar 40 is less than the distal bar gap 90. Stated another way, upon attachment of the guide bars 46 to the hub 42, the guide bars 46 deflect outwardly so that the bar distal ends 80 are farther apart than the intermediate section 82 of each guide bar 46. This allows the guide bars 46 to accurately and gently guide the storage tape 22 onto the hub 42.

Figure 4:
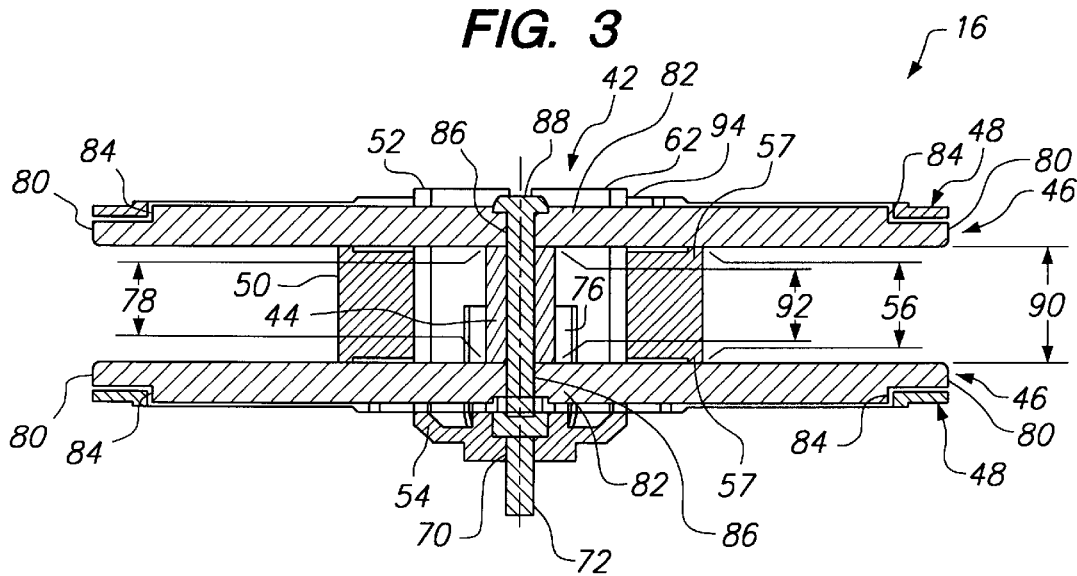
FIG. 4 is a cut-away view taken on line 4—4 in FIG. 3.
Figure 5:
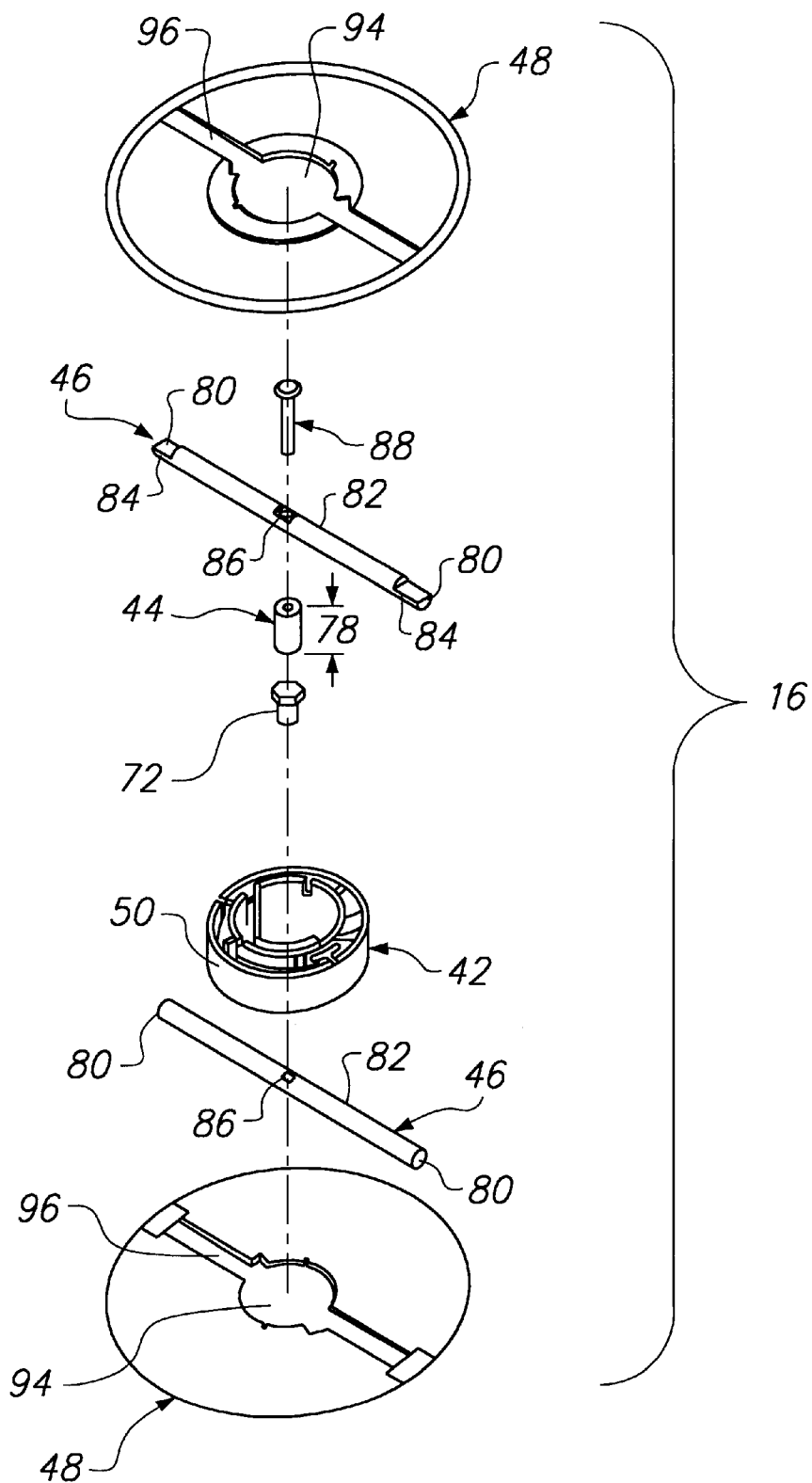
FIG. 5 is an exploded view of the reel illustrated in FIG. 3.

As can best be seen with reference to FIG. 5, each flange 48 is substantially disk shaped and includes a circular hub aperture 94 and a rectangular, guide aperture 96. The hub aperture 94 fits over a portion of the inner ring 52 of the hub 42 while the guide aperture 96 fits over one of the guide bars 46. Each flange 48 can be secured to the hub 42 with an adhesive. As can best be seen with reference to FIG. 4, each flange 48 is positioned behind one of the guide bars 46. Thus, with the present invention, the primary function of each flange 48 is aesthetics because the guide bars 46 guide the storage tape 22 onto the hub 42. Further, because the guide bars 46 guide the storage tape 22 onto the hub 42 and the flanges 48 are positioned behind the guide bars 46, the flanges 48 do not interfere with the take-up leader which is wrapped around the take-up reel 16. Thus, an involute is not necessary in one of the flanges 48. This simplifies the manufacturing of each flange 48.

Assembly of the take-up reel 16 can best be understood with reference to FIGS. 4 and 5. Initially, the hub attachment bolt 72 is positioned within the socket aperture 70 of the attachment cap 54. Next, one of the guide bars 46 is positioned within the guide apertures 74 in the attachment cap 54 and one of the flanges 48 is secured to the inner ring 52 of the hub 42. Subsequently, the bar spacer 44 is positioned between the spacer supports 76 of the inner ring 52. The spacer supports 76 insure that the bar spacer 44 is properly aligned. Next, the other guide bar 46 is positioned within the guide slots 64 of the inner ring 52 and the other flange 48 is attached to the hub 42. Finally, the bar attachment bolt 88 is positioned through the attachment aperture 86 in the upper guide bar 46 (as illustrated in FIG. 4) and threaded into the attachment aperture 86 in the lower guide bar 46 (as illustrated in FIG. 4). The bar attachment bolt 88 is tightened until the guide bars 46 contact the bar spacer 44. Because the spacer width 78 is less than the hub width 56, the guide bars 46 deflect to provide clearance to guide the storage tape 22.

Next, the take-up reel 16 is attached to the tape drive 10 by threading the hub attachment bolt 72 into the reel shaft. The wrench slots 66 and the wrench are utilized to tighten the hub attachment bolt 72.

While the particular tape drive 10 as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A reel adapted for receiving a storage tape, the storage tape having a tape width, the real comprising:

a hub which is sized and shaped to receive the storage tape, the hub including substantially opposed axial sides; and a pair of substantially radially extending and substantially axially opposed guide bars which are secured to the opposed sides of the hub, the guide bars being axially spaced apart by a bar gap and adapted for guiding the storage tape onto the hub between the guide bars, each guide bar including a bar distal end; wherein the bar gap between the guide bars increases substantially continuously from near the hub to the bar distal ends of the guide bars; wherein each guide bar extends completely transversely across one of the hub sides.

2. The reel of claim 1 including a bar spacer for spacing respective intermediate sections of the guide bars apart from each other, the bar spacer having a spacer width which is less than a hub width of the hub.

3. A reel adapted for receiving a storage tape, the storage tape having a tape width, the reel comprising:

a hub which is sized and shaped to receive the storage tape, the hub having a hub width;

a pair of substantially axially opposed and substantially radially extending guide bars which are secured to the opposite axial sides of the hub, the guide bars being axially spaced apart, each guide bar radially extending completely transversely across one of the hub sides, the guide bars being adapted for guiding the storage tape onto the hub between the guide bars, each guide bar including an intermediate section; and a bar spacer inside the hub for contacting and spacing the respective intermediate sections of the guide bars spaced apart from each other, the bar spacer having a spacer width which is less than the hub width.

4. The reel of claim 3 wherein each guide bar includes a bar distal end and the bar distal ends of the guide bars are spaced apart from each other a distal bar gap which is greater than a hub width of the hub and the tape width of the tape.

5. The reel of claim 4 wherein each guide bar includes a bar intermediate section and the bar intermediate sections of the guide bars are spaced apart from each other an intermediate bar gap which is less than the distal bar gap.

6. The reel of claim 3 wherein at least one of the guide bars includes a rounded cross-section so that the storage tape contacts a rounded surface.

7. A cartridge including the reel of claim 3.

8. A tape drive including the reel of claim 3.

9. A storage library including the tape drive of claim 8.

10. A tape drive adapted to receive a cartridge, the cartridge including a storage tape having a tape width, the tape drive comprising:

a drive housing;

a data transducer secured to the drive housing, the data transducer being adapted to interact with the storage tape; and a take-up reel secured to the drive housing and adapted to rotate relative to the drive housing, the take-up reel including (i) a hub which is sized and shaped to receive the storage tape from the cartridge, the hub having a hub width and a pair of axially spaced apart hub sides; and (ii) a pair of radially extending and substantially axially opposed guide bars which are secured to the sides of the hub, each guide bar extending completely transversely across one of the hub sides, the guide bars being axially spaced apart and adapted for guiding the storage tape onto the hub between the guide bars; wherein each guide bar includes a bar distal end and the bar distal end of the guide bars is spaced apart a distal bar gap which is greater than the hub width of the hub and the tape width of the tape.

11. The tape drive of claim 10 wherein the take-up reel includes a bar spacer for spacing the guide bars apart, the bar spacer being substantially encircled by the hub, and the spacer having a spacer width which is less than the hub width.

12. A tape drive adapted to receive a cartridge, the cartridge including a storage tape having a tape width, the tape drive comprising:

a drive housing;

a data transducer secured to the drive housing, the data transducer being adapted to interact with the storage tape; and a take-up reel secured to the drive housing and adapted to rotate relative to the drive housing, the take-up reel including (i) a hub which is sized and shaped to receive the storage tape from the cartridge, the hub having a hub width, (ii) a pair of radially extending and substantially axially opposed guide bars which are secured to opposite axial sides of the hub, the guide bars being spaced apart, each guide bar radially extending completely transversely across one of the hub sides, the guide bars being adapted for guiding the storage tape onto the hub between the guide bars, and (iii) a bar spacer for contacting and spacing the guide bars apart, the bar spacer being substantially encircled by the hub, and the spacer having a spacer width which is less than the hub width; wherein each guide bar includes a bar distal end and the bar distal end of the guide bars is spaced apart a distal bar gap which is greater than the hub width of the hub and the tape width of the tape.

13. The tape drive of claim 12 wherein at least one of the guide bars includes a rounded cross-section so that the storage tape contacts a rounded surface.

14. The tape drive of claim 12 wherein each guide bar includes a bar intermediate section and the bar intermediate section of the guide bars is spaced apart an intermediate bar gap which is less than the distal bar gap.

15. A storage library including the tape drive of claim 12 and a cartridge.

16. A method for manufacturing a reel adapted for receiving a storage tape having a tape width, the method comprising the steps of:

providing a hub having a hub width which is adapted to receive the storage tape, the hub having a pair of axially opposed hub sides;

providing a pair of guide bars, each guide bar including a bar distal end; and attaching one of the guide bars to each of the hub sides so that the guide bars are substantially axially opposed and each guide bar radially extends completely transversely across one of the hub sides and deflecting the guide bars so that a distal bar gap between the distal ends of the guide bars is larger than the hub width.

17. The method of claim 16 wherein the step of attaching the guide bars includes the step of spacing the guide bars apart with a bar spacer which is substantially encircled by the hub, the bar spacer having a spacer width which is less than the hub width so that the guide bars are deflected upon attachment to the hub.

* * * * *